United States Patent
Wu et al.

(10) Patent No.: US 11,120,337 B2
(45) Date of Patent: Sep. 14, 2021

(54) SELF-TRAINING METHOD AND SYSTEM FOR SEMI-SUPERVISED LEARNING WITH GENERATIVE ADVERSARIAL NETWORKS

(71) Applicants: Dalei Wu, St. Laurent (CA); Md Akmal Haidar, Montreal (CA); Mehdi Rezagholizadeh, Montreal (CA); Alan Do-Omri, St. Laurent (CA)

(72) Inventors: Dalei Wu, St. Laurent (CA); Md Akmal Haidar, Montreal (CA); Mehdi Rezagholizadeh, Montreal (CA); Alan Do-Omri, St. Laurent (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 999 days.

(21) Appl. No.: 15/789,628

(22) Filed: Oct. 20, 2017

(65) Prior Publication Data
US 2019/0122120 A1   Apr. 25, 2019

(51) Int. Cl.
G06N 3/04   (2006.01)
G06N 3/08   (2006.01)

(52) U.S. Cl.
CPC ........... *G06N 3/088* (2013.01); *G06N 3/0454* (2013.01)

(58) Field of Classification Search
CPC .............................. G06N 3/0454; G06N 3/088
See application file for complete search history.

(56) References Cited

U.S. PATENT DOCUMENTS

| | | |
|---|---|---|
| 8,781,782 B2 | 7/2014 | Yuan |
| 9,342,793 B2 | 5/2016 | Williamson |
| 2003/0046297 A1 | 3/2003 | Mason |
| 2009/0099988 A1 | 4/2009 | Stokes et al. |
| 2012/0158624 A1 | 6/2012 | Lingenfelder et al. |
| 2015/0199609 A1 | 7/2015 | Rao et al. |

(Continued)

FOREIGN PATENT DOCUMENTS

| | | |
|---|---|---|
| CN | 105279519 A | 1/2016 |
| CN | 106096627 A | 11/2016 |

(Continued)

OTHER PUBLICATIONS

Bousmalis, Konstantinos, et al. "Unsupervised pixel-level domain adaptation with generative adversarial networks." Proceedings of the IEEE conference on computer vision and pattern recognition. Jul. 21-26, 2017. (Year: 2017).*

(Continued)

*Primary Examiner* — Hal Schnee

(57) ABSTRACT

A method and system for augmenting a training dataset for a generative adversarial network (GAN). The training dataset includes labelled data samples and unlabelled data samples. The method includes: receiving generated samples generated using a first neural network of the GAN and the unlabelled samples of training dataset; determining a decision value for a sample from a decision function, wherein the sample is a generated sample of the generated samples or an unlabelled sample of the unlabelled samples of the training dataset; comparing the decision value to a threshold; in response to determining that the decision value exceeds the threshold: predicting a label for a sample; assigning the label to the sample; and augmenting the training dataset to include the sample with the assigned label as a labelled sample.

20 Claims, 6 Drawing Sheets

(56) References Cited

U.S. PATENT DOCUMENTS

| | | | |
|---|---|---|---|
| 2018/0211164 A1* | 7/2018 | Bazrafkan | G06N 3/088 |
| 2018/0336439 A1* | 11/2018 | Kliger | G06N 3/0472 |
| 2019/0327501 A1* | 10/2019 | Walters | G06N 3/084 |

FOREIGN PATENT DOCUMENTS

| | | |
|---|---|---|
| WO | 2016077127 A1 | 5/2016 |
| WO | 2017158058 A1 | 9/2017 |

OTHER PUBLICATIONS

Zhi He et al, Generative Adversarial Networks-Based Semi-Supervised Learning for Hyperspectral Image Classification. Remote Sens. 2017, 9, 1042; Oct. 12, 2017, 27 pages.

D. Wu, "Parameter estimation for $\alpha$-GMM based on maximum likelihood criterion", Neural computation 21 (6), 1776-1795 2009.

D Wu, Y Yin, H Jiang, "Large-Margin Estimation of Hidden Markov Models With Second-Order Cone Programming for Speech Recognition", IEEE Transactions on Audio, Speech, and Language Processing 19 (6), 1652-1664 2010.

Ian Goodfellow et al., "Generative adversarial nets", NIPS 2014. 2014.

T. Salimans et al., "Improved techniques for Training GANs", https://arxiv.org/pdf/1606.03498.pdf 2016.

D. W. Farley and Y. Bengio, "Improving Generative Adversarial Networks with Denoising Feature Matching", ICLR 2017. 2017.

M. Arjovsky and L. Bottou, "Towards Principled Methods for Training Generative Adversarial Network", ICLR 2017 2017.

M. Arjovsky et al., "Wasserstein GAN", https://arxiv.org/pdf/1701.07875.pdf 2017.

Yarowsky, D. "Unsupervised Word Sense Disambiguation Rivaling Supervised Methods". Proceedings of the 33rd Annual Meeting of the Association for Computational Linguistics. Cambridge, MA, pp. 189-196, 1995 1995.

S. Abney, "Understanding the Yarowsky algorithm", Journal of Computational Linguistics, vol. 30, No. 3, 2004, pp. 365-395 2004.

Yan Zhou, Murat Kantarcioglu, and Bhavani Thuraisingham, "Self-Training with Selection-by-Rejection", 2012 IEEE 12th International Conference on Data Mining, 2012 2012.

C. Rosenberg, M. Hebert, and H. Schneiderman, "Semi-supervised self-training of object detection models", Application of Computer Vision, 2005. WACV/MOTIONS '05 vol. 1. Seventh IEEE Workshops on, 2005 2005.

Rajat Raina, Alexis Battle, Honglak Lee, Benjamin Packer, Andrew Y. Ng, "Self-taught learning: transfer learning from unlabeled data", ICML '07 Proceedings of the 24th international conference on Machine learning, pp. 759-766, 2007 2007.

Li, Chongxuan, et al. "Triple Generative Adversarial Nets." arXiv preprint arXiv:1703.02291 (2017). 2017.

Sixt, L. et al. "RENDERGAN: Generating Realistic Labeled Data", ICLR 2017, https://arxiv.org/pdf/1611.01331.pdf 2017.

Mao, X. et al. "Least Squares Generative Adversarial Networks", https://arxiv.org/abs/1611.04076 2017.

Springenberg, J.T. "Unsupervised and semi-supervised learning with categorical generative adversarial networks" ICLR 2016, https://arxiv.org/pdf/1511.06390.pdf 2016.

Shrivastava, A. et al. "Learning from Simulated and Unsupervised Images through Adversarial Training", Apple Inc. 2016.

Kingma, D. et al. "Semi-Supervised Learning with Deep Generative Models", Online: https://arxiv.org/pdf/1406.5298 2014.

Odena, A, "Semi-Supervised Learning with Generative Adversarial Networks", https://arxiv.org/pdf/1606.01583.pdf 2016.

Redford, A. et al. "Unsupervised representation learning with deep convolutional generative adversarial networks", ICLR 2016, https://arxiv.org/pdf/1511.06434.pdf 2016.

Teng, T-H, et al. "Self-Organizing Neural Networks Integrating Domain Knowledge and Reinforcement Learning", IEEE Transactions on Neural Networks and Learning Systems, vol. 26, No. 5 pp. 889-902 2015.

Sudo, A. et al. "Associative Memory for Online Learning in Noisy Environments Using Self-Organizing Incremental Neural Network", IEEE Transactions on Neural Networks, vol. 20, No. 6, pp. 964-972 2009.

\* cited by examiner

```
                    ┌─────────────────────────────────────┐
                   ┌│  Initialize Discrimintor D and Generator G
       Initial-    ││              202
       ization     │└─────────────────────────────────────┘
       phase       │              ↓
       201         │┌─────────────────────────────────────┐
                   ││  Define Loss Functions for D and G according to
                   ││          loss_D and loss_G
                   │└              204                    ┘
                    └─────────────────────────────────────┘
```

Initialization phase 201
- Initialize Discrimintor D and Generator G — 202
- Define Loss Functions for D and G according to $loss_D$ and $loss_G$ — 204

Training Phase: Train D and G — 208

- Reinitiate dataset $X_{gen}$ : $X_{gen} \leftarrow \emptyset$ — 206

- Establish data subset:
  - $(x_{lab}, y_{lab}) \leftarrow$ subset of labelled data from dataset $X_{lab}$
  - $(x_{unl}, ?) \leftarrow$ subset of unlabelled data from dataset $X_{unl}$
  - $(x_{gen}, ?) \leftarrow$ generated data from G
  - 210

- $X_{gen} \leftarrow X_{gen} \cup \{x_{gen}\}$ — 216

- Compute D's loss based on: $x_{lab}, y_{lab}, x_{unl}, x_{gen}, loss_D$
  Backpropagate the error to the parameters — 218

- Compute G's loss based on: $x_{unl}, x_{gen}, loss_G$
  Backpropagate the error to the parameters — 220

(Repeat for m batches)

- Validation Error Decreasing for $X_{train(j)}$? 221
  - Y → (loop back to Establish data subset)
  - N → To 222

FIG. 3

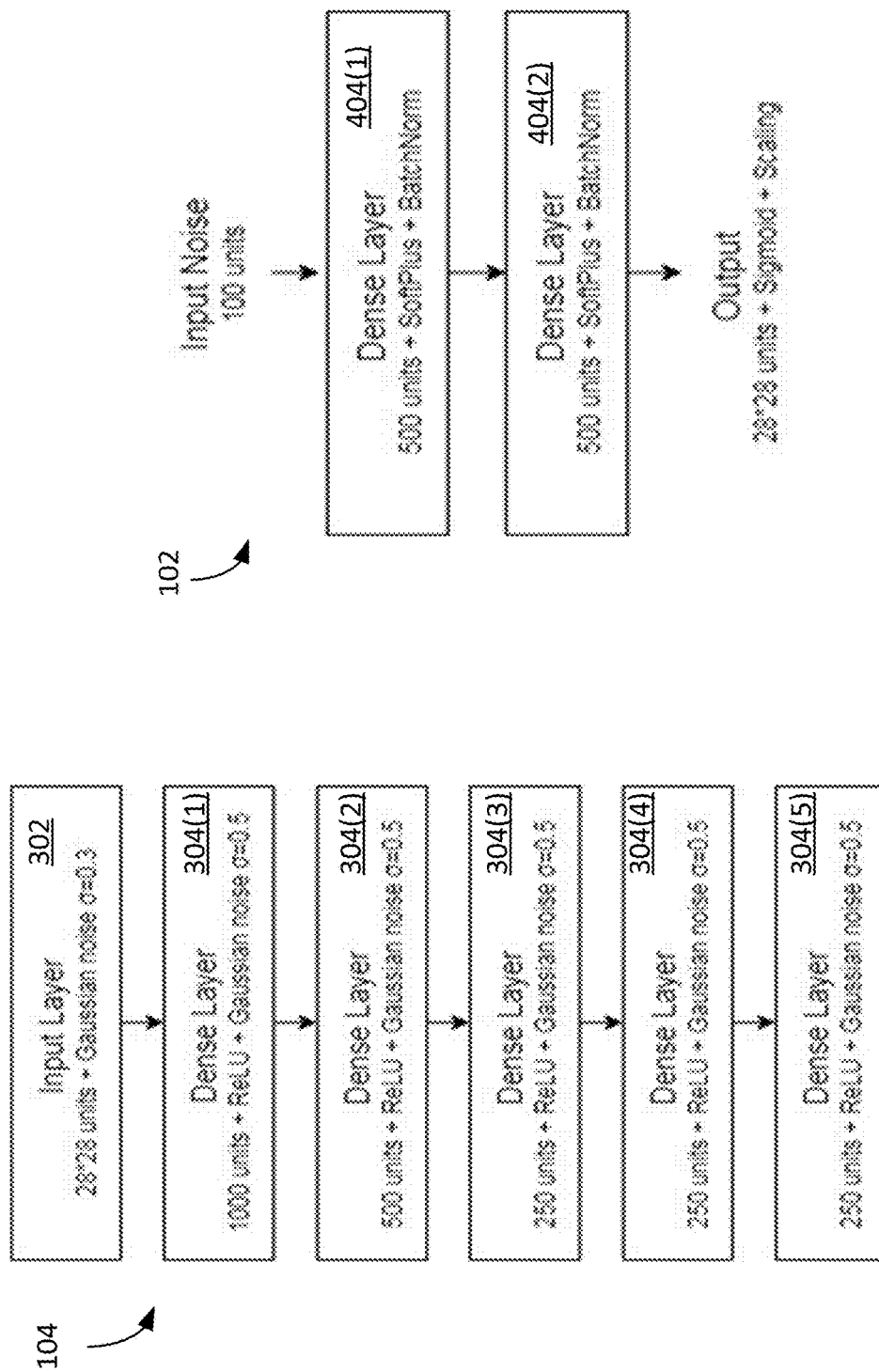

SELF-TRAINING METHOD AND SYSTEM FOR SEMI-SUPERVISED LEARNING WITH GENERATIVE ADVERSARIAL NETWORKS

FIELD

The present disclosure relates to generative adversarial networks, and in particular to semi-supervised learning in generative adversarial networks.

BACKGROUND

In the machine learning domain, semi-supervised learning involves deriving a general mapping F: X→Y from a data space X to a labeling space Y using a small set of labeled data $X_l=(x_l, y_l)$ and a large set of unlabelled data $X_u=(x_u,?)$, where their labels are unknown.

Traditional methods to address semi-supervised learning have included the using statistical models, such as hidden Markov models (HMMs) and Gaussian mixture models (GMMs). Recent efforts have been focused on employing a breaking-through technique of generative adversarial networks (GANs). A GAN includes a generator to produce data and a discriminator to classify data, engaged in a two-player minimax game to improve the performance of each other. The GAN may, for example, employ a least square as a loss function. With improved GAN, the original GAN has been trained for unconditional semi-supervised learning and with triple GANs, for conditionally semi-supervised learning.

GANs can provide powerful capacity for generating realistic synthetic images. Much of the current research in this domain is focused on improving the visual quality of generated images and the training stability of GANs. However, the issue of how to further exploit the visual characteristics of these generated images, in particular in the context of semi-supervised GAN, is still unclear.

Self-training has previously been studied in the machine learning domain, including for example the Yarowsky algorithm which has been applied to word sense disambiguation. However, traditional machine learning typically uses labelled and unlabelled data and lacks appropriate mechanisms for generating and then using synthetic data to improve classification performance.

Accordingly, there is a need to further develop and exploit the self-training potential offered with semi-supervised GANs.

SUMMARY

Example aspects of the present disclosure provide a method and system for self-training using a GAN that uses unlabelled and generated datasets for estimating data distribution and classification.

In at least some examples, the methods and system described herein introduce self-training capacity to GANs that are enabled for self-supervised training. In at least some examples, the methods and systems described herein provide a mechanism to automatically augment a training dataset by expanding the size of a training dataset stored in a databank to include additional labelled samples, there facilitating evolutionary learning.

The self-learning GAN methods and systems described in this document may offer one or more benefits over existing methods and systems in at least some applications. For example, at least some embodiments described herein provide a method of using self-training in an adversarial network for both data generation and label classification. This is in contrast to traditional methods that use self-training only for label classification. Furthermore, in contrast to traditional methods that apply self-training for classification solely based on unlabelled data, embodiments described herein use not only unlabelled data, but also generated unlabelled data, thereby substantially increasing the volume of data for training the discriminator. Additionally, in at least some embodiments, adversarial training is combined with self-training, and thus the overall system becomes evolutionary.

According to a first example aspect is a method for augmenting a training dataset for a generative adversarial network (GAN). The training data set includes labelled samples and unlabelled samples. The method includes: receiving generated samples generated using a first neural network of the GAN and the unlabelled samples of training dataset; determining a decision value for a sample from a decision function, wherein the sample is a generated sample of the generated samples or an unlabelled sample of the unlabelled samples of the training dataset; comparing the decision value to a threshold; in response to determining that the decision value exceeds the threshold: predicting a label for a sample; assigning the label to the sample; and augmenting the training dataset to include the sample with the assigned label as a labelled sample.

In some aspects, determining a decision value for the sample, comparing the decision value to a threshold, predicting the label, assigning the label, and augmenting the training dataset are repeated for a plurality of the generated samples and unlabelled samples.

In some aspects, the method includes updating unlabelled samples to remove any unlabelled samples to which labels have been assigned, and augmenting the generated samples to remove any generated samples to which labels have been assigned.

In some aspects, the method includes, prior to predicting the label, training the GAN using the training dataset. In some aspects, the method includes, after augmenting the training dataset, training the GAN using the augmented training dataset. In some aspects, the method includes receiving new generated samples generated using the first neural network of the GAN and unlabelled samples of the augment training dataset, and determining a decision value for the sample, comparing the decision value the threshold, predicting the label for the sample, assigning the label, and augmenting the training dataset are repeated for a plurality of the new generated samples and the unlabelled samples of the augment training dataset. In some aspects, training of the GAN, determining a decision value for the sample, predicting the label, assigning the label, and augmenting the training dataset are repeated until a validation error for the GAN stops decreasing in respect of the augmented training data set. In some aspects, the decision function depends on information about the sample. In some aspects, the decision value generated from the decision function is a posterior probability for the sample generated by the second neural network.

According to a further aspect is a system for augmenting a training dataset for a generative adversarial network (GAN), the training dataset including labelled samples and unlabelled samples. The system includes a processing device and a memory coupled to the processing device. The memory stores computer-executable instructions that, when executed by the processing device, cause the system to: receive generated samples generated using a first neural network of the GAN and the unlabelled samples of training dataset; determine a decision value for a sample from a decision function, wherein the sample is a generated sample of the generated samples or an unlabelled sample of the unlabelled samples of the training dataset; compare the decision value to a threshold; responsive to determining that the decision value exceeds the threshold: predict a label for a sample; assign the label to the sample; and augment the training dataset to include the sample with the assigned label as a labelled sample.

According to a further aspect is a computer program product for augmenting a training dataset for a generative adversarial network (GAN). The training dataset comprising labelled samples and unlabelled samples. The computer program product includes a computer readable medium storing program code, wherein the program code, when run on a computer, causes the computer to: receive generated samples generated using a first neural network of the GAN and the unlabelled samples of training dataset; determine a decision value for a sample from a decision function, wherein the sample is a generated sample of the generated samples or an unlabelled sample of the unlabelled samples of the training dataset; compare the decision value to a threshold; responsive to determining that the decision value exceeds the threshold: predict a label for a sample; assign the label to the sample; and augment the training dataset to include the sample with the assigned label as a labelled sample.

BRIEF DESCRIPTION OF THE DRAWINGS

Reference will now be made, by way of example, to the accompanying drawings which show example embodiments of the present application, and in which:

FIG. 3 is a flow diagram of initialization and training phases of the method of FIG. 2 according to an example embodiment;

FIG. 5 is block diagram of a discriminator of the GAN of FIG. 1 according to an example embodiment;

FIG. 6 is block diagram of a generator of the GAN of FIG. 1, according to an example embodiment.

Similar reference numerals may have been used in different figures to denote similar components.

DESCRIPTION OF EXAMPLE EMBODIMENTS

Figure 1:
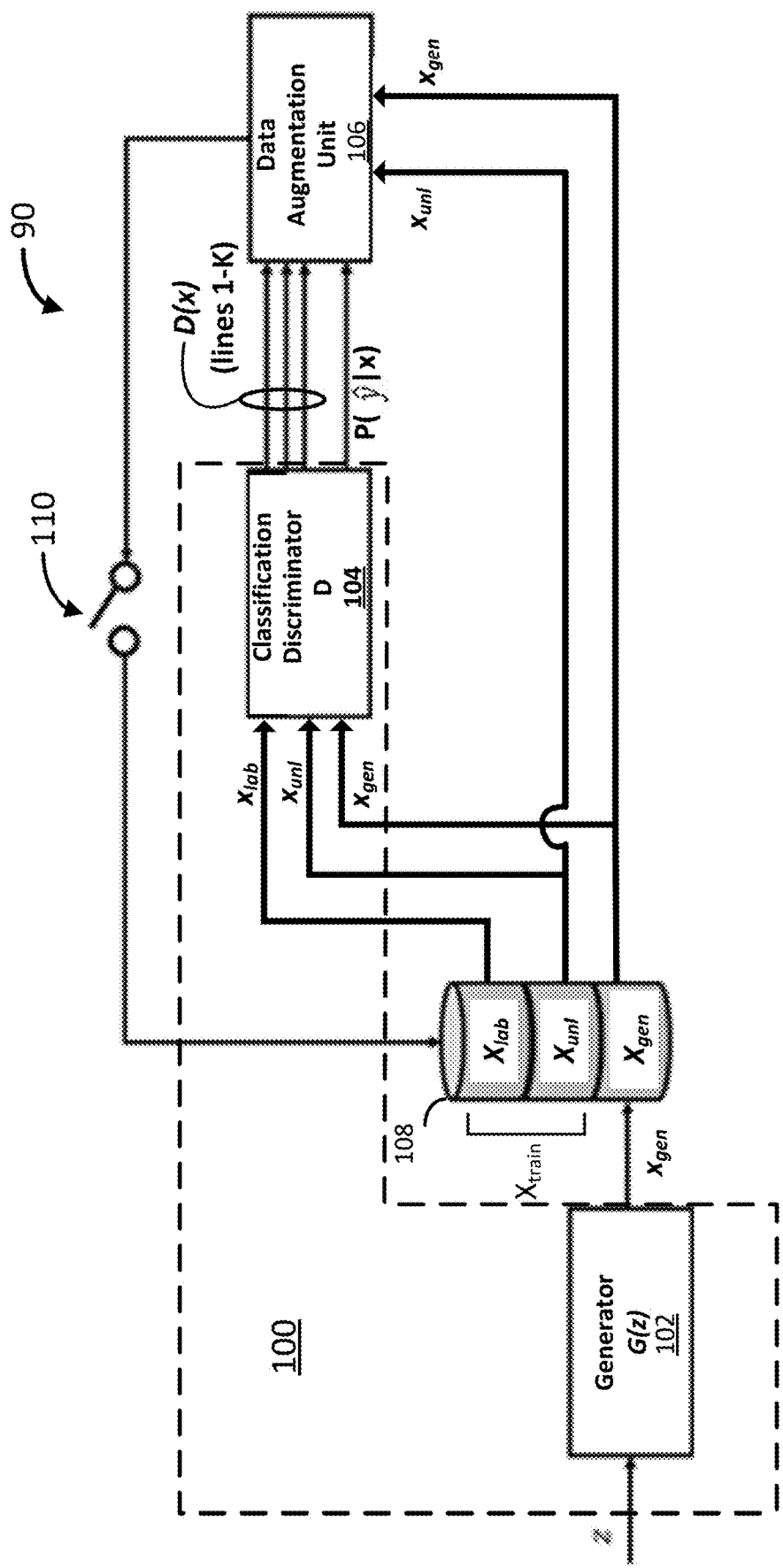
FIG. 1 is a block diagram of a self-training, semi-supervised learning system that incorporates a Generative Adversarial Network (GAN) according to a first example embodiment.

Typically, generative adversarial networks (GANs) include two separate deep neural networks: a first neural network (generally referred to in the art as a generator) and a second neural network (generally referred to in the art as a discriminator). The generator takes in a random variable, z, with a distribution $P_z(z)$ and attempts to map the random variable z to provide a realistic generated sample within a data distribution $P_{data}(x)$. Conversely, the discriminator is expected to discern real samples from generated samples by giving the output of 1 or 0 respectively. In the GAN training process, the generator and discriminator are used to generate samples and classify them respectively to improve the performance of each other in an adversarial manner. A GAN implements a two-player minimax game with the objective of deriving a Nash-equilibrium point. For example, the following adversarial loss function has previously been employed in training a generator and discriminator:

$$\min_G \max_D \{E_{x \sim P_{data}(x)}[\log D(x)] + E_{z \sim P_z(z)}[\log(1 - D(G(z)))]\}. \quad \text{Equation (1)}$$

Semi-supervised learning is concerned with addressing the problem of deriving a general mapping F: X→Y from a data space X to a labeling space Y using a small set of labeled data, denoted by $X_{lab} = (x_{lab}, y_{lab})$ and a large set of unlabelled data, denoted by $X_{unl} = (x_{unl}, ?)$), as represented by Equation (2) below:

$$\left. \begin{array}{c} (x_l, y_l) \\ (x_u, ?) \end{array} \right\} X \rightarrow y = F(X) \rightarrow y \quad \text{Equation (2)}$$

This disclosure describes a self-training method and system for semi-supervised GANs. In example embodiments, a first neural network (generally referred to hereinafter as a generator) is used to generate synthetic data (referred to herein as generated samples). A second neural network (generally referred to hereinafter as a discriminator) is configured to receive as inputs a set of training data (referred to hereinafter as a training dataset). The training dataset includes a set of labelled training data (referred to hereinafter as a labelled training dataset) comprising labelled training data (referred to hereinafter as labelled samples), a larger set of unlabelled training data (referred to herein as an unlabelled training dataset) comprising unlabelled training data (referred to hereinafter as unlabelled samples), and the generated samples. In at least some examples, the unlabelled training dataset includes at least 10 times as many samples as the labelled training dataset.

The discriminator is configured to discriminate the generated samples from the training samples (e.g. the labelled samples and the unlabelled samples) and also predict labels for the unlabelled samples and the generated samples. Based on the outputs from the discriminator, a data augmentation unit is used to compare the posterior probability of a label for each unlabelled sample and each generated sample. The data augmentation unit can be implemented in the GAN or can be a separate module coupled to the GAN. When the posterior probability for the label for a given sample (e.g. the unlabelled sample or the generated sample) exceeds a threshold confidence level, the given sample is assigned the label and converted to a labelled training sample. The newly labelled sample is merged into the labeled training dataset, thereby augmenting the labelled training dataset and expanding the size of the labelled training dataset. Progressively, the growing labeled training data set is used with newly generated data samples to further train the semi-supervised GAN. Augmenting the training dataset by adding labelled samples to the training dataset using the method and system described herein improves the performance of the GAN.

In this regard, FIG. 1 shows a schematic architecture of a semi-supervised, self-training system 90 (referred to hereinafter as self-training system 90) according to example embodiments. As shown in FIG. 1, the self-training system 90 includes a GAN 100, a data augmentation unit 106, and a data bank 108. In an example embodiments, the GAN 100 includes two feedforward neural networks, namely a generator feedforward neural network G(z) 102 (referred to hereinafter as generator G(z) 102) and a classification/discriminator feedforward neural network D 104 (referred to hereinafter as discriminator D 104). As illustrated by switch 110, data augmentation unit 106 of the self-training system 90 can be selectively connected to the data bank 108 to add newly labelled samples to the training dataset stored in the data bank 108 to augment the training dataset as described in further detail below. Further, the data augmentation unit 106 can be selectively disconnected from the data bank 108 to train the GAN 100 using the augmented training dataset as described in further detail below.

The generator G(z) 102 is configured to map a random noise vector z that has been drawn from a uniform or normal noise distribution $p_z(z)$ to produce generated samples $x_{gen}$ that simulate real samples. The generated data samples $x_{gen}$ are added to a dataset $X_{gen}$ of generated samples that are stored in the data bank 108. Data bank 108 also includes a training dataset $X_{train}$. Training dataset $X_{train}$ includes a labelled dataset $X_{lab}$ that includes labelled training samples $x_{lab}$ and an unlabelled dataset $X_{unl}$ that includes unlabelled training samples $x_{unl}$. The discriminator D 104 receives generated samples $x_{gen}$, along with labelled training samples $x_{lab}$ and unlabelled training data samples $x_{unl}$, and tries to discriminate the generated samples $x_{gen}$ as fake from the labelled and unlabelled training data samples $x_{lab}$, $x_{unl}$. The discriminator D 104 is also configured to perform a classification function to determine probabilities for the different class labels $y_i$ to $y_k$ that can be applied to an unlabelled sample (which can be a generated sample $X_{gen}$ or an unlabelled training sample $x_{unl}$). In the example of FIG. 1, discriminator D 104 is also configured to distinguish between K possible label classes. Each of the $i^{th}$ component of the K-dimensional output of the discriminator D(x) 104 in FIG. 1 represents a confidence score that a sample x (which can be a generated sample $x_{gen}$, an unlabelled sample $x_{unl}$, or a labelled sample $x_{lab}$) belongs to class $y_i$. Discriminator D 104 is also configured to generate a posterior probability value $P(y_i|x)$ for predicting that a possible label $y_i$ is the correct label for the sample x (which can be a generated sample $x_{gen}$, an unlabelled sample $x_{unl}$, or a labelled sample $x_{lab}$).

Figure 2:
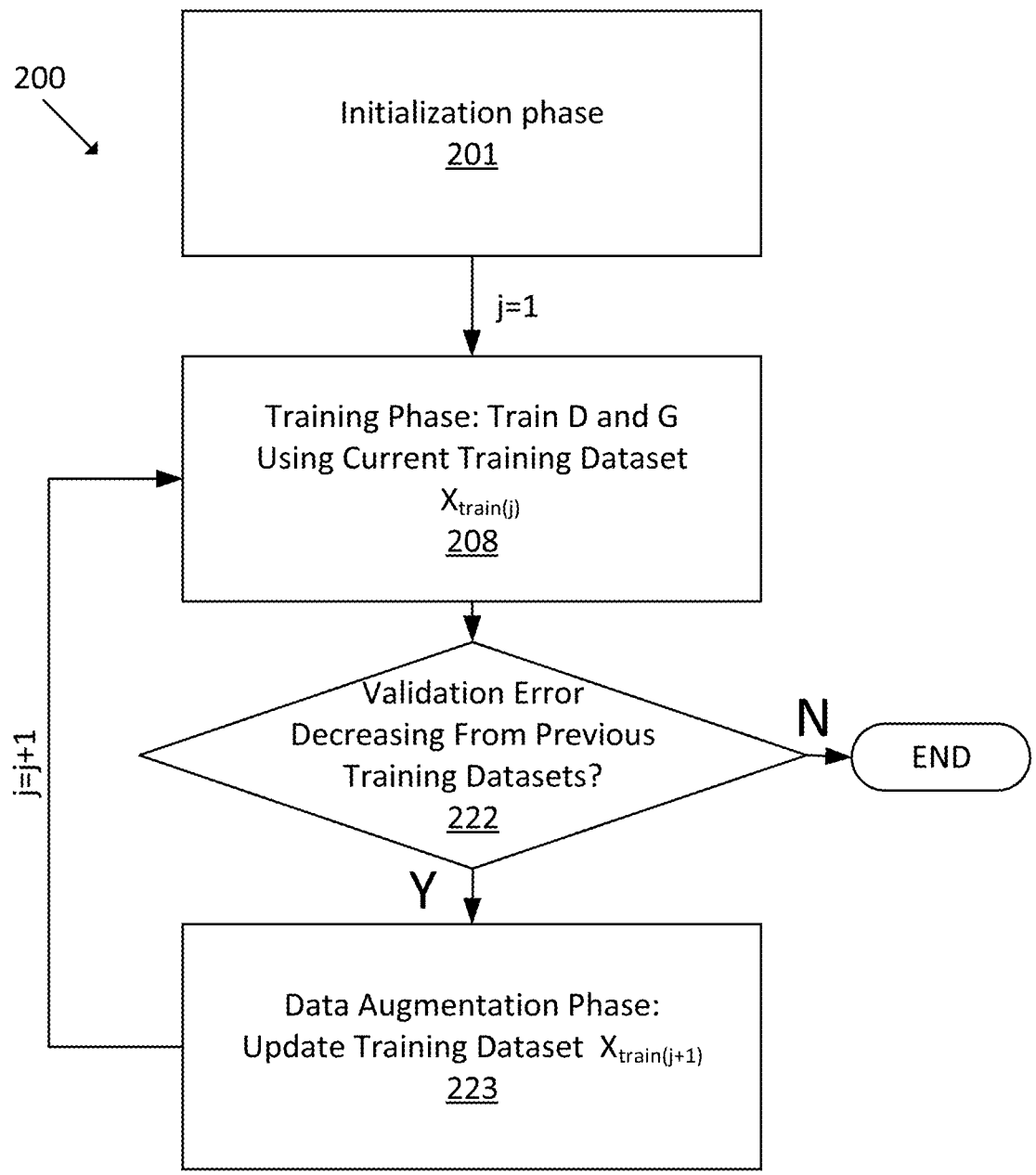
FIG. 2 is a flow diagram of a self-training, semi-supervised learning method that can be implemented using the system of FIG. 1, according to example embodiments.

An example of the operation of self-training system 90 will now be described with reference to FIGS. 2 to 4. In this regard, FIG. 2 illustrates an overview of a self-training, semi-supervised learning method 200 that can be implemented using system 90 according to example embodiments. Method 200 includes an initialization phase 201, followed by a training phase 208 and a data augmentation phase 223. In example embodiments, the method 200 is implemented on a processing system 600 (described in greater detail below) using the Python programming language and the Python libraries Theano and Lasagne. In some examples, the Adam optimization algorithm is used to iteratively update the discriminator D 104 and generator G 102 networks during the training phase 208. In alternative embodiments, other programming languages, libraries and optimization algorithms may be used. As will be explained in greater detail below, the data augmentation phase 223 is carried out by data augmentation unit 106 in combination with the generator G 102 and discriminator D 104. As illustrated in FIG. 2, the training phase 208 and data augmentation phase 223 are alternatively and repetitively performed on an evolving training dataset until a validation error for a validation dataset stops decreasing (block 222).

FIG. 3 illustrates the initialization phase 201 and training phase 208 of FIG. 2 in detail. In the example of FIG. 3, the initialization phase 201 commences with defining and initializing the feedforward neural networks used to implement the discriminator D 104 and the generator G 102 (block 202). Non-limiting examples of possible architectures for the feedforward neural networks used to implement the discriminator D 104 and the generator G 102 are illustrated in FIGS. 5 and 6 respectively. As shown in FIG. 5, in one example, the discriminator D 104 contains an input layer 302 followed by five successive dense layers 304(1)-304(5). As shown in FIG. 6, in one example, the generator G 102 includes two successive dense layers 404(1)-404(2). Initial generator weighting parameters θ and discriminator weighing parameters ω are set as part of the initialization phase 201. It will be appreciated although FIG. 5 and FIG. 6 illustrate feedforward neural networks used to implement the discriminator D 104 and the generator G 102, any suitable neural network architecture may be used to implement the discriminator D 104 and the generator G 102.

In example embodiments, data augmentation unit 106 is also defined and initialized as part of the initialization phase 201. In example embodiments, data augmentation unit 106 is initialized and trained to perform the thresholding operations discussed in greater detail below.

As indicated at block 204, the loss functions $loss_D$ and $loss_G$ for the discriminator D 104 and generator G 102 are defined as part of the initialization phase 201. In an example embodiment the loss function $loss_D$ for the discriminator D 104 is defined as a sum of the error distances of the supervised and unsupervised loss functions as represented by the equation:

$$loss_D = E_{x \sim plab(x)}[\|D(x)-y\|^2] + E_{z \sim pz(z), x \sim punl(x)}[D(G(z))-D(x)] \quad \text{Equation (3)}$$

Where:
$E_{x \sim plab(x)}[\|D(x)-y\|^2]$ is the supervised loss, in which:
$p_{lab}(x)$ is the distribution of the labelled samples $x_{lab}$;
$\|D(x)-y\|^2$ is the square of the distance between the estimated label D(x) for a labelled sample $x_{lab}$ and the ground truth label y for the labelled sample $x_{lab}$;
$E_{z \sim pz(z), x \sim punl(x)}[D(G(z))-D(x)]$ is the unsupervised loss, in which:
$p_z(z)$ is the distribution of the noise z input into generator G;
$p_{unl}(x)$ is the distribution of the unlabelled samples $x_{lab}$; and
$[D(G(z))-D(x)]$ is the confidence score difference between a generated sample and a real sample (e.g. training sample) belonging to a certain class.

In example embodiments the loss function $loss_G$ for the Generator G 102 is defined as feature matching between D(G(z)) and D(x) as represented by the equation:

$$loss_G = E_{z \sim pz(z), x \sim punl(x)}[(D(G(z))-D(x))^2] \quad \text{Equation (4)}$$

Variations of the above loss functions can be defined and applied in different embodiments. By way of example, the following alternative loss functions could be used in place of equations (3) and (4):

$$loss_D = E_{x \sim plab(x)}[\|D(x)-y\|^2]^2 + E_{z \sim pz(z), x \sim punl(x)}[D(G(z))-D(x)]^2 \quad \text{Equation (3-A)}$$

$$loss_G = E_{z \sim pz(z), x \sim punl(x)}[(D(G(z))-D(x))^2]^2 \quad \text{Equation (4-A)}$$

Once the discriminator D 104 and the generator G 102 have been initialized and their respective loss functions defined, the training phase 208 starts, as shown at block 206 in FIG. 3. As indicated at block 206, the training phase 208 begins with dataset $X_{gen}$ stored in data bank 108 being initiated to zero so that the training phase 208 starts with an empty generated dataset $X_{gen}$. The training phase also begins with a current training dataset $X_{train(j)}$, where j denotes an iteration number for the training dataset. The training dataset $X_{train(j)}$ is pre-populated with unlabelled training dataset $X_{unl}$ and labelled training dataset $X_{lab}$. As noted above, in example embodiments the unlabelled training dataset $X_{unl}$ includes at least 10 times as many samples as the labelled training dataset $X_{lab}$.

In example embodiments, the training phase 208 is an iterative phase during which the generator G 102 and discriminator D 104 are trained using the current training dataset $X_{train(j)}$ until a validation error for a validation dataset stops decreasing, as shown by blocks 210 to 221. In particular an adversarial game is played for improving the discrimination and classification performance by the discriminator D 104 and the data generation performance by generator G 102 simultaneously. As indicated in block 210, each iteration of the training phase 208 begins with the establishment of a subset or batch of training data that includes: a batch of labelled samples ($x_{lab}$, $y_{lab}$) that is a subset of the labelled training dataset $X_{lab}$; a batch of unlabelled samples ($x_{unl}$, $y_{unl}$) that is a subset of the unlabelled training dataset $X_{unl}$, and a batch of generated samples ($x_{gen}$) that are generated by generator G 102. As indicated in block 216, the generated samples ($x_{gen}$) are merged into the generated dataset $X_{gen}$ for the current training phase 208.

As indicated in block 218, the discriminator D 104's loss is determined based on its defined loss function $loss_D$ and the subset of samples $x_{lab}$, $y_{lab}$, $x_{unl}$ and $x_{gen}$ and the resulting error backpropagated to adjust the weighting parameters ω of the feedforward neural networks used to implement discriminator D 104. As indicated in block 220, the generator G 102's loss is determined based on its defined loss function $loss_G$ and the subset of samples $x_{unl}$ and $x_{gen}$, and the error backpropagated to adjust the weighting parameters θ of the feedforward neural networks used to implement discriminator G 102. In example embodiments, the generator G 102 is trained by applying a feature matching loss that uses an intermediate layer output of discriminator D104 for the unlabelled training samples ($X_{unl}$) and generated samples ($X_{gen}$) respectively. In some examples embodiments, an Adam optimization is used to back propagate the discriminator weighting parameters ω, followed by another Adam optimization to back propagate the generator weighting parameters θ.

As indicated in block 221, a determination is then made whether the validation error on a predetermined validation dataset has stopped decreasing. As known in the art, the validation dataset is a predetermined dataset that is used to determine when training of the discriminator D 104 has reached a level where the validation error reaches its minimal level. If the validation error is still decreasing then the GAN 100 has still not been optimally trained using the current training dataset $X_{train(j)}$. Thus, if the validation error has not yet stopped decreasing, the training phase 208 enters another iteration using the same training dataset $X_{train(j)}$ with an additional set of generated samples $x_{gen}$, and the actions described above in respect of blocks 210 to 221 are repeated. As indicated by the dashed line in FIG. 3, in some example embodiments, blocks 210 to 220 are repetitively performed for sets of batches of samples (for example m sets of batches of n samples) prior to the validation testing of block 221.

When the validation testing of block 221 indicates that the error on the validation dataset has stopped decreasing in respect the current training dataset $X_{train(j)}$, an assumption is made that the GAN 100 has been optimally trained in respect of the current training dataset $X_{train(j)}$ and the current training phase 208 is concluded. The method 200 then progresses to block 222, as shown in FIG. 2. As noted above, the training phase 208 and data augmentation phase 223 are alternatively and repetitively performed on an evolving training dataset until a validation error for a validation dataset stops decreasing. Accordingly at the conclusion of the current training phase 208, the validation error determined in respect of the current training dataset $X_{train(j)}$ is compared against the validation error determined in respect of one or more previous training datasets $X_{train(j-1)}$ to determine if the validation error is still declining as the training dataset evolves. In the event that the validation error is no longer decreasing, the self-training/semi-supervised method 200 is concluded.

However, in the event that the validation error is still declining for the evolving training dataset, data augmentation phase 223 is performed to further evolve the training dataset $X_{train(j)}$ to produce a new, augmented training set $X_{train(j+1)}$ for the next iteration of the training phase 208. Data augmentation phase 223 that is illustrated in FIG. 4. The actions represented by blocks 224 to 234 of the data augmentation phase 223 are reiterated for each sample x that belongs to the current unlabelled training dataset $X_{unl}$ and the generated dataset $X_{gen}$. As indicated in block 224, data augmentation phase 223 begins with the data augmentation unit 106 receiving the generated samples of the generated dataset $X_{gen}$, current unlabelled training dataset $x_{unl}$ from the data bank 108, and a posterior probability $P(y_i|x)$ for a sample x from the discriminator D 104. In an example embodiment, the posterior probability P(yi|x) is an output vector that corresponds to the Softmax of the output of the neural network of the discriminator D 104, which is determined using the following equation:

$$P(y_i|x)=[\exp(output_i)]/[\Sigma^K_{k=1} \exp(output_k)] \quad \text{Equation (5)}$$

Where K is equal to the number of classes (i.e. the number different possible labels that can be assigned to a sample), and i is the index of the class.

As indicated by block 228, a value for a decision function T (f, x) for the sample x is determined and compared against a threshold. The decision function T (f, x) returns a value (referred to hereinafter as a decision value) that indicates whether the sample x should be added to the labelled dataset of the training dataset based on information about the sample x. The information about the sample is denoted by f in the decision function T (f, x). The information about the sample x may be an output of the neural network used to implement the discriminator 104, the posterior probability $P(y_i|x)$ for the sample, or any other feature that is derivable from the sample. In some embodiments of the data augmentation phase 223, a few subsets of unlabelled or generated samples may be labelled and new GANs may be trained using each of these subsets to see which subset of unlabelled or generated samples gives the best GAN. In this example embodiment, the validation score that the GAN obtains while being trained with the sample x (or a set where sample x belongs) is considered information f since the validation score can be used to know whether the sample should be assigned a label and added to the labelled dataset as described in further detail below.

In some embodiments, the decision value generated from the decision function T (f, x) is the posterior probability $P(y_i|x)$ for the sample and when the posterior probability $P(y_i|x)$ for the sample x exceeds a threshold having a value of 0.5 for a particular label $y_i$, where 1≤i≤K, and K is the number of label classes, the data augmentation phase 223 proceeds to block 230. In some other embodiments, the decision function generates a decision value of 1 if the sample is to be assigned a label and added to the training dataset, and 0 otherwise. In this example embodiment, the threshold has a value of 0. In the example embodiment where multiple subsets of unlabelled and generated samples are taken and the decision function T (f, x) represents the new validation score, a sample x can be added to the labelled training set if T (f, x)>1 (e.g. the threshold has a value of 1 and 1 is the previous validation score (e.g. the validation score when the GAN 100 is not trained on a subset containing the sample x).

As indicated in block 230, in the event that the decision function T (f, x) is greater than a threshold then the sample x is assigned a label that corresponds to the possible label $y_i$ having the highest posterior probability $P(y_i|x)$ determined for the sample x, as follows: $y^* \leftarrow$ arg max $P(y_i|x)$. As indicated at block 232, the training dataset ($X_{train(j+1)}$) is updated to add the newly labelled sample (x,y*) to the labelled training dataset $X_{lab}$ stored in data bank 108, as indicated by: $X_{lab} \leftarrow X_{lab} \cup \{(x,y^*)\}$. As indicated in block 234, the newly labelled sample (x,y*) can in example embodiments be removed from the generated dataset $X_{gen}$ if the sample was originally a generated sample $x_{gen}$, or removed from the unlabelled training dataset $X_{unl}$ if the sample was originally an unlabelled training sample $x_{unl}$.

Returning again to block 228, in the event that the posterior probability $P(y_i|x)$ is less than a threshold then the sample x is ignored and not assigned a label. As indicated in block 236, the actions indicated in blocks 224 to 234 of the data augmentation phase 223 are repeated for each of the samples x, or each subset of the samples x, in the unlabelled training dataset $X_{unl}$ and the generated dataset $X_{gen}$.

When all of the samples x or a subset of the samples x in the unlabelled training dataset $X_{unl}$ and the generated dataset $X_{gen}$ have been labelled or ignored, the newly augmented training dataset $X_{train(j+1)}$ is then set as the current training dataset and the training phase 208 is repeated.

Figure 4:
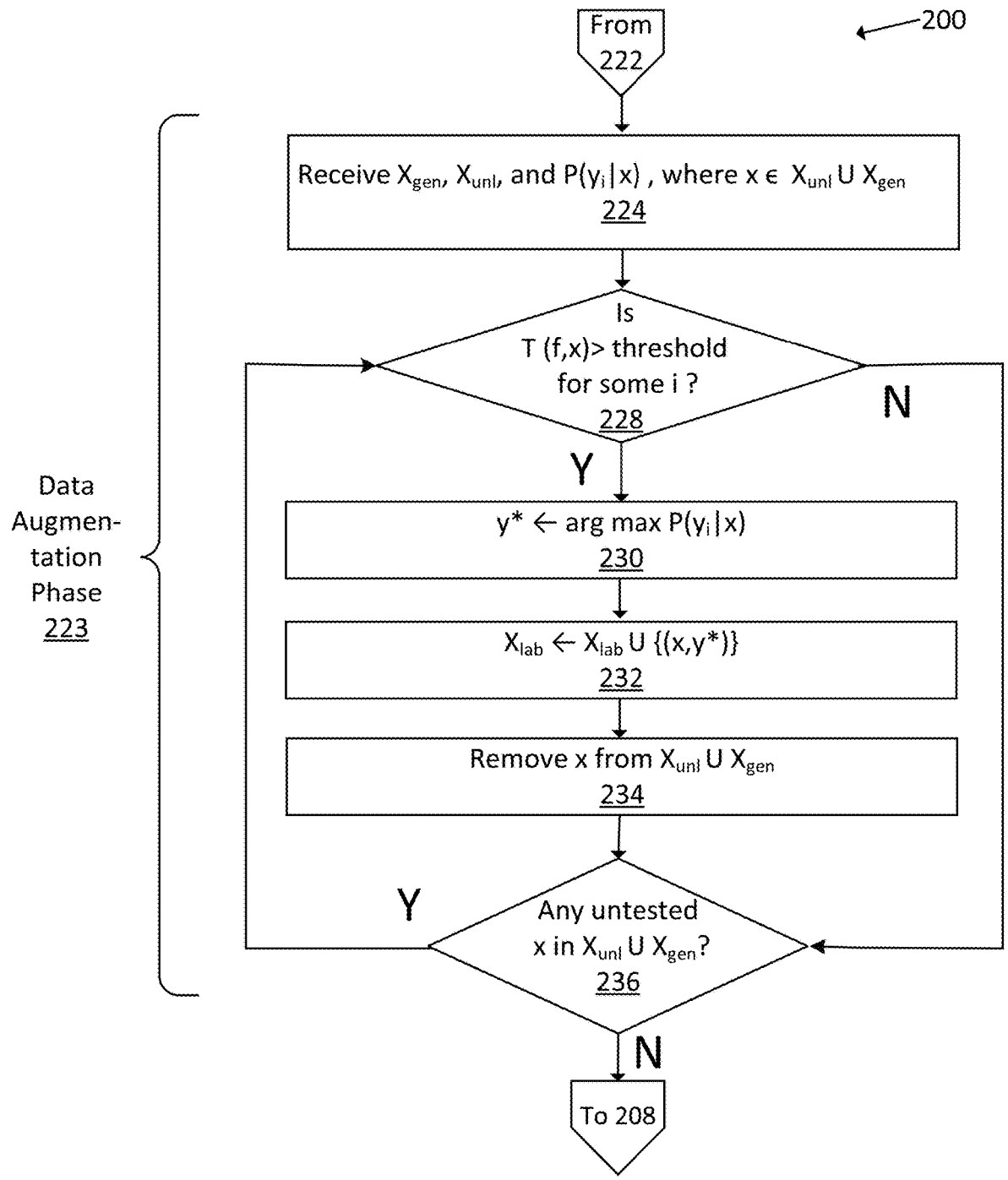
FIG. 4 is a flow diagram of an augmentation phase of the method of FIG. 2 according to an example embodiment.

In summary, the self-training/semi-supervised method 200 illustrated in FIGS. 2 to 4 includes training phase 208 for training discriminator D 104 and generator G 102 using a current training dataset. After the training phase 208 is a data augmentation phase 223 that iterates through all samples x or all subsets of the samples x of the unlabelled training dataset $x_{unl}$ and generated $X_{gen}$ dataset to determine if a decision function T (f, x) for the sample x, exceeds a threshold. If so, the predicted label y* is assigned to the sample x and the now labelled sample (x,y*) is added to the labelled training dataset $X_{lab}$. In some embodiments the sample x is removed from either the unlabelled training dataset $X_{unl}$ or generated dataset $X_{gen}$ from which the sample originated. In some embodiments, the dataset $X_{gen}$ stored in data bank 108 is reinitialized as indicated at step 206 for every new training phase, and the new augmented training dataset that includes labelled and unlabelled training datasets $X_{lab}$ and $X_{unl}$ is then used to retrain the discriminator D 104 and generator G 102. In some embodiments, the dataset $X_{gen}$ stored in data bank 108 is not reinitialized for every new training phase. In these embodiments new generated samples generated by the generator G 102 for every new training phase are added to the dataset $X_{gen}$ stored in the data bank 108. The training and augmentation phases 208, 223 continue repeating until the validation error for the GAN 100 stops decreasing between evolutions of the augmented training data set $X_{train}$.

Accordingly, in example embodiments a self-learning mechanism is used to grow the labelled training dataset $X_{lab}$ of data bank 108 for semi-supervised training of GAN 100. To select the appropriate samples used to grow the training dataset stored in the data bank 108, a decision function T (f, x) is used. Using a decision function T (f, x) can enable the method 200 to be used with a wide variety of different decision schemes, which includes hard and soft thresholding. For example, a desired distribution model can be selected as the threshold.

The described embodiments introduce a self-training capacity to semi-supervised training with GAN and provides a mechanism to automatically expand the size of the training dataset stored in the data bank 108, thus being able to make learning evolutionary in at least some applications.

In example embodiments, once the system 90 has been trained it can be used to generate training datasets of labelled data that can then be used to train other artificial intelligence (AI) systems.

The method and system of the present disclosure can be used in any general AI applications, including, but not limited to, autonomous driving for predicting a steering angle, object detection, healthcare applications (e.g. cancer detection), and consumer electronics (e.g. mobile applications). For example, in the case of autonomous driving, samples can include front camera images and associated labelling can include a steering angle applied to each of the images. In the case of object detection, the samples may include a camera image and the associated label can include one or more class labels that identify objects included in the image. In the case of healthcare applications, the samples could include ultrasound images and the associated labels could include class labels that identify if an anomaly is present in the ultrasound images. In the case of consumer electronics, the samples could include measured RF activity for one or more channels and the associated labels could include an RF channel suitability indicator.

The configurations of the neural networks used to implement the GAN architecture described above are not critical, but instead used just as one example. Many revisions to the layers of the neural networks, such as weights, activation functions and normalization methods, leading to a different neural net would be possible.

Figure 7:
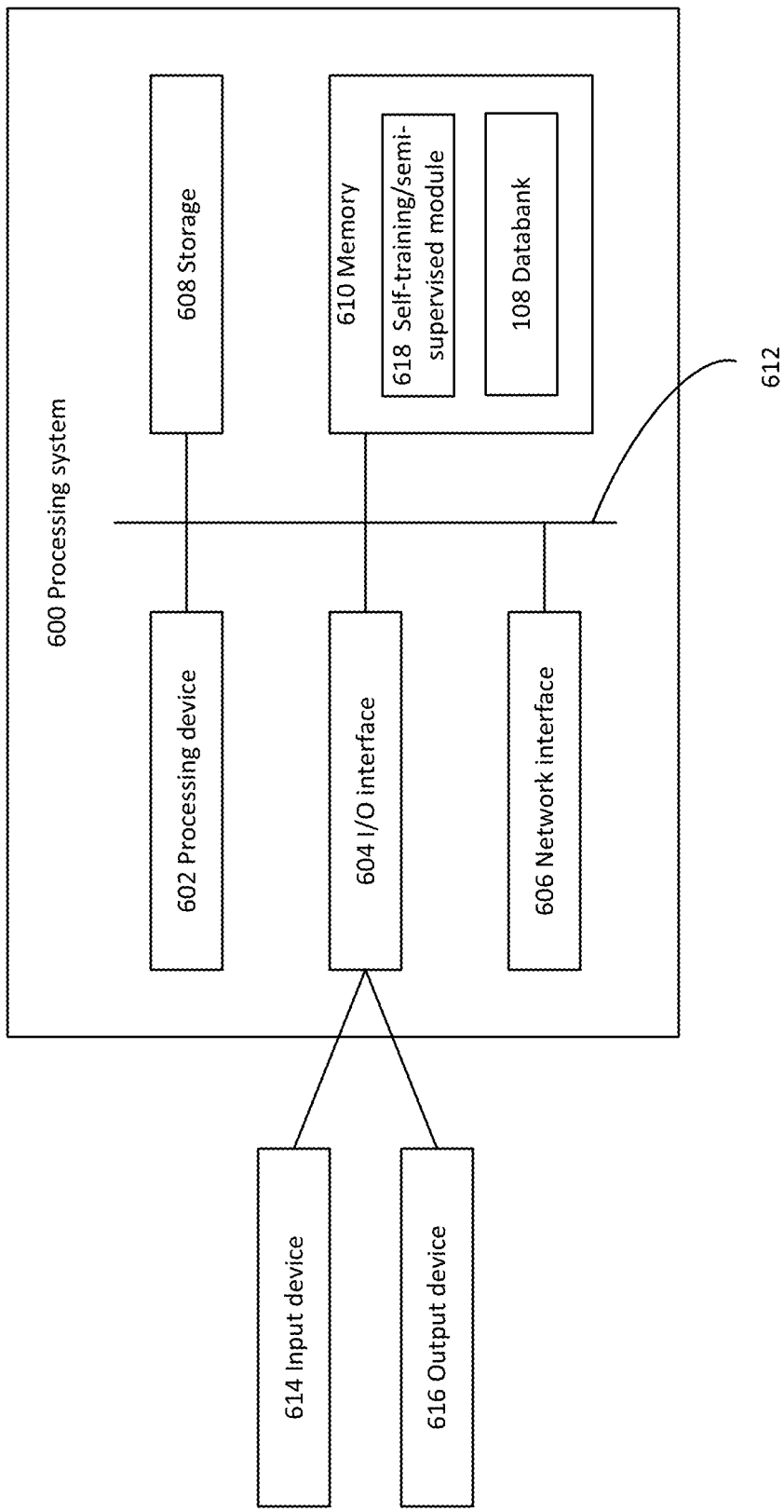
FIG. 7 is a block diagram illustrating an example processing system suitable for implementing examples disclosed herein.

FIG. 7 is a block diagram of an example simplified processing system 600, which may be used to implement embodiments disclosed herein, and provides a higher level implementation example. The method 200 may be implemented using the example processing system 600, or variations of the processing system 600. The processing system 600 could be a server or a desktop terminal, for example, or any suitable processing system. Other processing systems suitable for implementing embodiments described in the present disclosure may be used, which may include components different from those discussed below. Although FIG. 7 shows a single instance of each component, there may be multiple instances of each component in the processing system 600.

The processing system 600 may include one or more processing devices 602, such as a graphics processing unit, a processor, a microprocessor, an application-specific integrated circuit (ASIC), a field-programmable gate array (FPGA), a dedicated logic circuitry, or combinations thereof. The processing system 600 may also include one or more input/output (I/O) interfaces 604, which may enable interfacing with one or more appropriate input devices 614 and/or output devices 616. The processing system 600 may include one or more network interfaces 606 for wired or wireless communication with a network (e.g., an intranet, the Internet, a P2P network, a WAN and/or a LAN) or other node. The network interfaces 606 may include wired links (e.g., Ethernet cable) and/or wireless links (e.g., one or more antennas) for intra-network and/or inter-network communications.

The processing system 600 may also include one or more storage units 608, which may include a mass storage unit such as a solid state drive, a hard disk drive, a magnetic disk drive and/or an optical disk drive. The processing system 600 may include one or more memories 610, which may include a volatile or non-volatile memory (e.g., a flash memory, a random access memory (RAM), and/or a read-only memory (ROM)). The non-transitory memory(ies) 610 may store instructions for execution by the processing device(s) 602, such as to carry out examples described in the present disclosure, for example to perform encoding or decoding. The memory(ies) 610 may include other software instructions, such as for implementing an operating system for the processing system 600 and other applications/functions. In some examples, one or more data sets and/or modules may be provided by an external memory (e.g., an external drive in wired or wireless communication with the processing system 600) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The processing system 600 may also include a bus 612 providing communication among components of the processing system 600, including the processing device(s) 602, I/O interface(s) 604, network interface(s) 606, storage unit(s) 608 and/or memory(ies) 610. The bus 612 may be any suitable bus architecture including, for example, a memory bus, a peripheral bus or a video bus.

In FIG. 7, the input device(s) 614 (e.g., a keyboard, a mouse, a microphone, a touchscreen, and/or a keypad) and output device(s) 616 (e.g., a display, a speaker and/or a printer) are shown as external to the processing system 600. In other examples, one or more of the input device(s) 614 and/or the output device(s) 616 may be included as a component of the processing system 600. In other examples, there may not be any input device(s) 614 and output device(s) 616, in which case the I/O interface(s) 604 may not be needed.

The memory(ies) 610 may include computer-executable instructions for a self-training/semi-supervised module 618 that, when executed, cause the processing system 600 to perform the self-training/semi-supervised method 200. The memory(ies) 610 may further store training data including the datasets of databank 108.

The neural networks used to implement generator G(z) 102 and discriminator D 104 may be implemented by any suitable processing unit, including the processing system 600 or variant thereof. Further, any suitable neural network, including variations such as recurrent neural networks long short-term memory (LSTM) neural networks, or any other neural network, may be used.

Although the present disclosure may describe methods and processes with steps in a certain order, one or more blocks of the methods and processes may be omitted or altered as appropriate. One or more blocks may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing system (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

What is claimed is:

1. A method for augmenting a training dataset for a generative adversarial network (GAN), the training dataset comprising labelled samples and unlabelled samples, the method comprising:
   receiving generated samples generated using a first neural network of the GAN and the unlabelled samples of training dataset;
   determining a decision value for a sample from a decision function, wherein the sample is a generated sample of the generated samples or an unlabelled sample of the unlabelled samples of the training dataset;
   comparing the decision value to a threshold;
   in response to determining that the decision value exceeds the threshold:
   predicting a label for a sample;
   assigning the label to the sample; and
   augmenting the training dataset to include the sample with the assigned label as a labelled sample.

2. The method of claim 1, wherein determining a decision value for the sample, comparing the decision value to a threshold, predicting the label, assigning the label, and augmenting the training dataset are repeated for a plurality of the generated samples and unlabelled samples.

3. The method of claim 2 comprising updating the unlabelled samples to remove any unlabelled samples to which labels have been assigned, and updating the generated samples to remove any generated samples to which labels have been assigned.

4. The method of claim 1 comprising, prior to receiving the generated samples and the unlabelled samples, training the GAN using the training dataset.

5. The method of claim 4 comprising, after augmenting the training dataset, training the GAN using the augmented training dataset.

6. The method of claim 5 comprising receiving new generated samples generated using the first neural network of the GAN and unlabelled samples of the augmented training dataset, and wherein determining a decision value for the sample, comparing the decision value to the threshold, predicting the label for the sample, assigning the label, and augmenting the training dataset are repeated for a plurality of the new generated samples and the unlabelled samples of the augment training dataset.

7. The method of claim 5 wherein training of the GAN, determining a decision value for the sample, predicting the label, assigning the label, and augmenting the training dataset are repeated until a validation error for the GAN stops decreasing in respect of the augmented training data set.

8. The method of claim 1 wherein the decision function depends on information about the sample.

9. The method of claim 1 wherein the decision value generated from the decision function is a posterior probability for the sample generated by the second neural network.

10. A system for augmenting a training dataset for a generative adversarial network (GAN), the training dataset comprising labelled samples and unlabelled samples, the system comprising:
a processing device; and
a memory coupled to the processing device, the memory storing computer-executable instructions that, when executed by the processing device, cause the system to:
receive generated samples generated using a first neural network of the GAN and the unlabelled samples of training dataset;
determine a decision value for a sample from a decision function, wherein the sample is a generated sample of the generated samples or an unlabelled sample of the unlabelled samples of the training dataset;
compare the decision value to a threshold;
responsive to determining that the decision value exceeds the threshold:
predict a label for a sample;
assign the label to the sample; and
augment the training dataset to include the sample with the assigned label as a labelled sample.

11. The system of claim 10 wherein the executable instructions, when executed by the processing device, cause the system to repeatedly, for a plurality of the generated samples and unlabelled samples: determine a decision value for the sample, compare the decision value to a threshold, predict the label, assign the label, and augment the training dataset.

12. The system of claim 11 wherein the executable instructions, when executed by the processing device, cause the system to update the unlabelled samples to remove any unlabelled samples to which labels have been assigned, and augment the generated samples to remove any generated samples to which labels have been assigned.

13. The system of claim 10 wherein the executable instructions, when executed by the processing device, cause the system to, prior to receiving the generated samples, train the GAN using the training dataset.

14. The system of claim 13 wherein the executable instructions, when executed by the processing device, cause the system to, after augmenting the training dataset, train the GAN using the augmented training dataset.

15. The system of claim 14 wherein the executable instructions, when executed by the processing device, cause the system to, receive new samples comprising generated samples generated using the first neural network of the GAN and unlabelled samples of the augmented training dataset, determine a decision value for a new sample of the new samples from the decision function, compare the decision value to the threshold, predict the label for the new sample, assign the label to the new sample, and augment the augmented training dataset to include the new sample with the assigned label as a labelled sample.

16. The system of claim 15, wherein the executable instructions, when executed by the processing device, cause the system to, repeatedly for a plurality of the new samples, determine a decision value for the new sample from the decision function, compare the decision value to the threshold, predict the label for the new sample, assign the label to the new sample, and augment the augmented training dataset to include the new sample with the assigned label as a labelled sample.

17. The system of claim 15 wherein training of the GAN, and determine a decision value for the sample, compare the decision value the threshold, predict the label, assigning the label, and augmenting the training dataset are repeated until a validation error for the GAN stops decreasing in respect of the augmented training dataset.

18. The system of claim 10 wherein the decision function depends on information about the sample.

19. The system of claim 10 wherein the decision value generated from the decision function is a posterior probability for the sample generated by the second neural network.

20. A computer program product for augmenting a training dataset for a generative adversarial network (GAN), the training dataset comprising labelled samples and unlabelled samples, the computer program product comprising a non-transitory computer readable medium storing program code, wherein the program code, when run on a computer, causes the computer to:
receive generated samples generated using a first neural network of the GAN and the unlabelled samples of training dataset;
determine a decision value for a sample from a decision function, wherein the sample is a generated sample of the generated samples or an unlabelled sample of the unlabelled samples of the training dataset;
compare the decision value to a threshold;
responsive to determining that the decision value exceeds the threshold:
predict a label for a sample;
assign the label to the sample; and
augment the training dataset to include the sample with the assigned label as a labelled sample.

* * * * *